Dec. 29, 1942.　　　M. RONNING　　　2,306,754
CORN SHELLER
Filed March 25, 1940　　　2 Sheets-Sheet 1
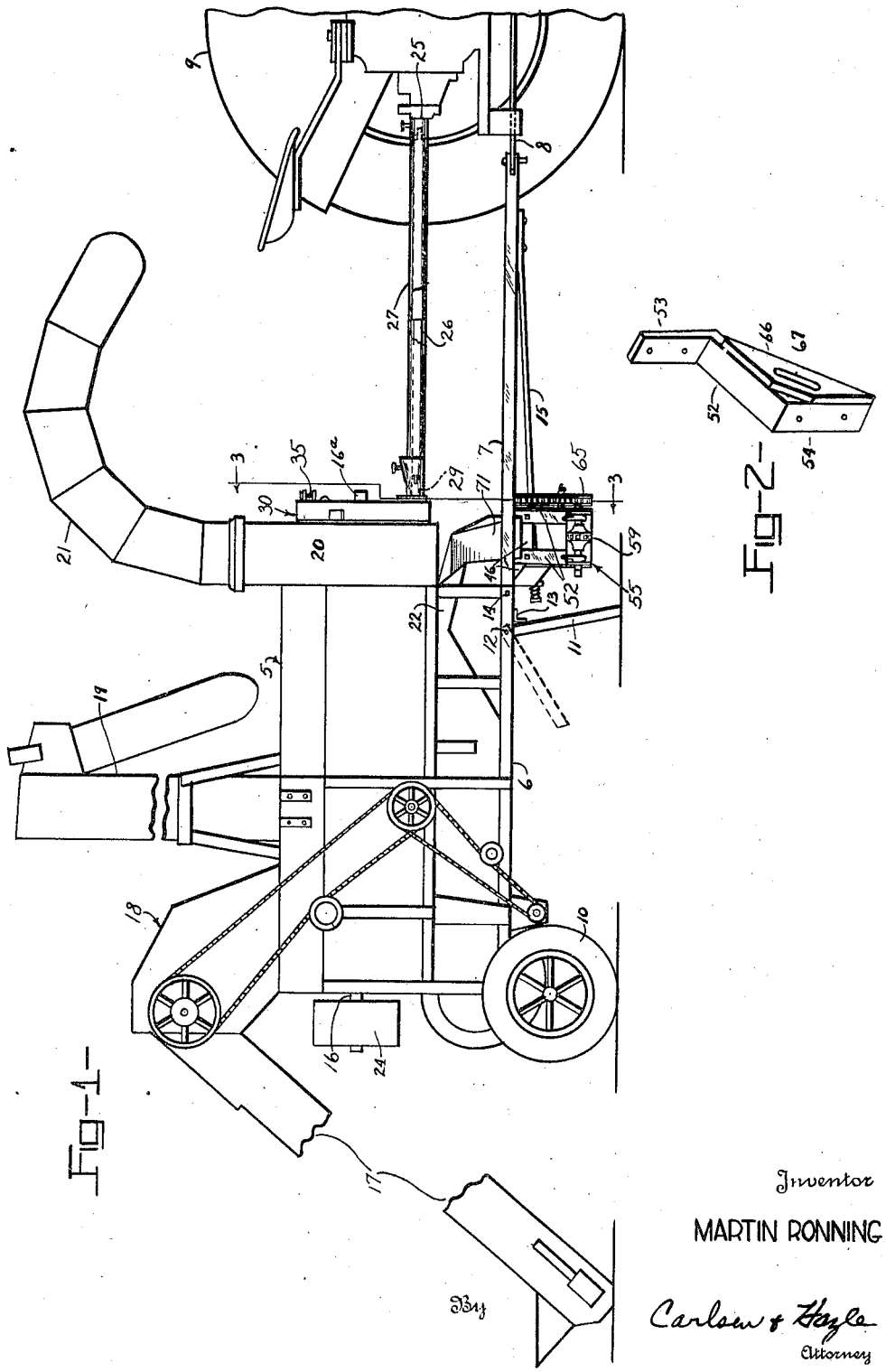
Inventor
MARTIN RONNING
By Carlsen & Hayle
Attorney Dec. 29, 1942.   M. RONNING   2,306,754
CORN SHELLER
Filed March 25, 1940   2 Sheets-Sheet 2
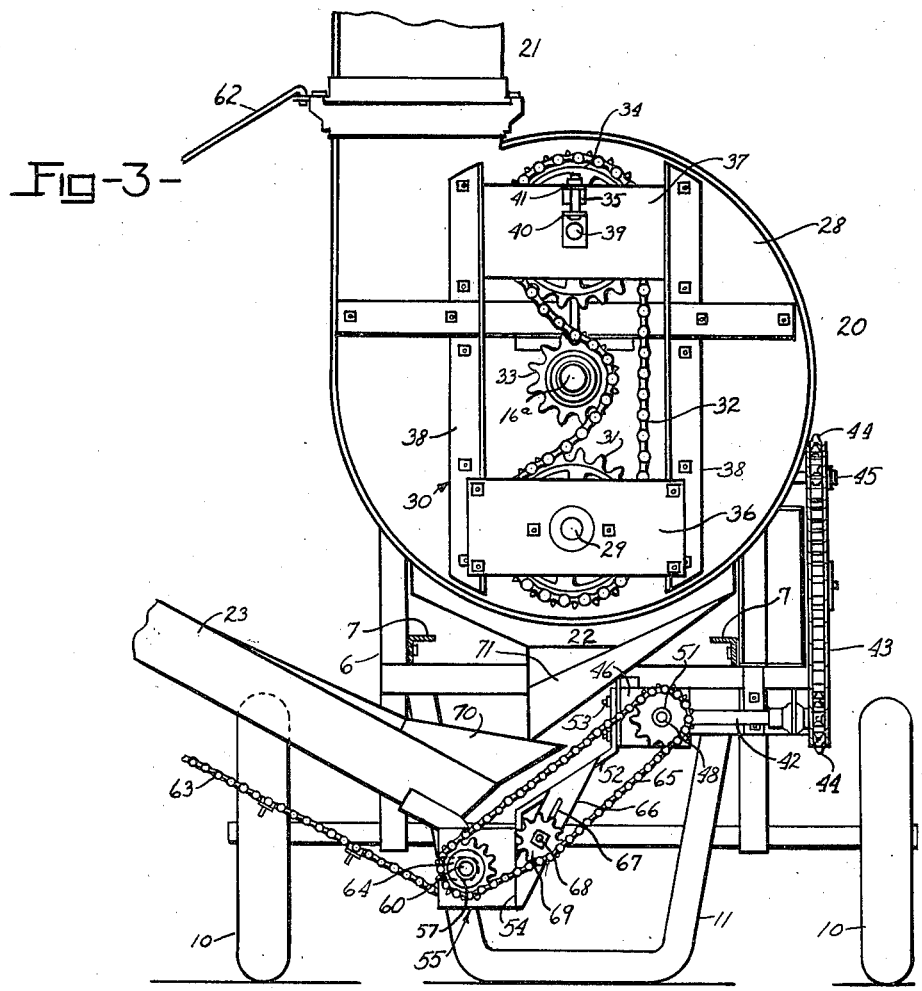
Fig-3-
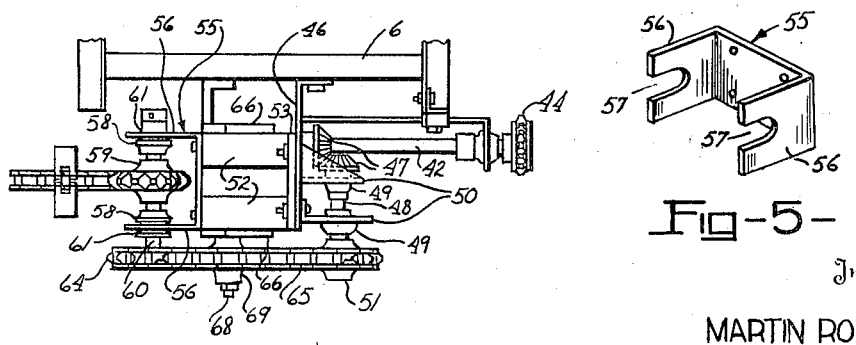
Fig-4-
Fig-5-
Inventor
MARTIN RONNING
Carloen + Hagle
Attorney Patented Dec. 29, 1942

2,306,754

UNITED STATES PATENT OFFICE 2,306,754

CORN SHELLER

Martin Ronning, St. Louis Park, Minn., assignor to Minneapolis-Moline Power Implement Company, Minneapolis, Minn., a corporation of Delaware Application March 25, 1940, Serial No. 325,750

1 Claim. (Cl. 130—6)

This invention relates generally to improvements in corn shellers of the tractor operated type and more particularly a means to provide a sheller which may be operated from the power takeoff of the tractor.

In previous machines of this kind with which I am familiar, it has been necessary to use a belt in order to drive the operating parts. This belt is difficult to keep clear and in operating condition during bad weather at which time the shelling operation is usually performed and generally has been unsatisfactory. Furthermore, in the use of the sheller it has been pulled upon its wheeled frame into desired operating position by a draft connection to the tractor and it has been necessary to disconect the tractor, run it around to the side, set up the belt system, and then reconnect the tractor after each shelling job has been performed. A considerable loss of time and unnecessary labor has resulted from this mode of operation. Also the proper leveling and rigid support of the sheller has been difficult, particularly as the machine is fairly light and is subject to considerable vibration in operation.

The primary object of my invention therefore, is to provide means whereby the corn sheller may be operated directly from the power takeoff of the tractor without the use of any belts whatever and without requiring that the sheller be disconnected from the tractor while in operation, thus saving time and enabling the tractor to serve as an anchoring means to support the sheller.

Another object is to provide means whereby the forward end of the sheller may be rigidly supported when in use but without requiring any disconnection from the tractor. A further object is to provide a novel and proven operating and supporting mechanism for the conveyor or stacker used for carrying out the cobs from the machine. Still a further object is to provide a simple and easily mounted driving means whereby the power takeoff shaft may be connected to the sheller for operating the working parts thereof.

These and other more detailed and specific objects will be disclosed in the course of the following specification, reference being had to the accompanying drawings, in which—

Fig. 1 is a side view of a sheller constructed in accordance with my invention, same being shown as connected to a tractor and set up for operation but with certain portions of the power takeoff and draft tongue broken away.

Fig. 2 is an enlarged perspective view of one of the brackets used for supporting the stacker or cob elevator.

Fig. 3 is a vertical section taken along the line 3—3 in Fig. 1 on an enlarged scale and showing the drive mechanism and cob stacker supporting an operating means.

Fig. 4 is a fragmentary plan view of the lower forward portion of the corn sheller frame showing the cob stacker supporting a driving means.

Fig. 5 is a detail perspective view of the yoke member supporting the cob stacker.

Referring now more particularly and by reference numerals to the drawings, the corn sheller comprises a substantially conventional housing 5 supported upon a frame 6 which is forwardly connected by a tongue or draft device 7 to the drawbar 8 of tractor 9. The frame 6 is rearwardly supported by transversely spaced wheels 10 and during transport these wheels and the tongue 7 constitute the entire support for the sheller enabling it to be drawn behind the tractor to any desired location. However, when the sheller is placed in operation, the forward end thereof requires more rigid support vertically and for this purpose I provide a retractible supporting member 11 which may be lowered to brace up the forward end of the sheller and relieve the operating and draft connections (later to be described) of "neck" weight. As represented in the drawings this supporting member 11 is constituted by a substantially U-shaped yoke member pivotally mounted at the upper ends 12 to the frame 6 and movable on the pivot points upwardly and rearwardly to a position clearing the ground. This member 11 may then be swung downwardly and forwardly on the transverse axis afforded by the pivots 12 to a position forward of the vertical at which point it contacts a stop member or cross bar 13 to maintain its more or less erect position. This operation is readily carried out by lowering the member until it contacts the ground and then moving the sheller rearwardly a short distance.

The tongue 7 is pivotally connected at its rear end 14 to forward extremities of the lower members of the frame 6 and during transport the tongue is restrained against upward displacement at its forward end by a tie rod 15 arranged as clearly shown.

The sheller housing 5 forms a support and enclosure for the usual operating parts which are all driven by a single longitudinal extended operating shaft 16 which is journaled from end to end to the housing. The construction and operation is such that corn carried by the feeder elevator or conveyor 17 may be fed through hopper 18 into the machine wherein the corn will be shelled and the kernels cleaned and delivered through the shelled corn elevator 19. The husks and the other light foreign matter are blown out through a suction fan at 20 and through an adjustable spout 21, clear of the machine while the cobs fall through the outlet end of 22 of the housing and are carried off from the machine through a cob stacker or elevator 23. Ordinarily, the operating shaft is driven by a rearwardly located belt pulley 24 on its extended rear end and the tractor is connected thereto by a belt (not shown). This operation of course required that the tractor be disconnected from the draft tongue 7 and run out to the side some distance from the sheller and connected thereto by belt and considerable maneuvering and time has been required in such operations. Furthermore, as heretofore stated, it has been found to be extremely difficult to keep a long length of belting clear and in operating condition particularly during the bad weather usually prevailing at the time when the corn shelling is done.

The tractor ordinarily used on the farm is of the general purpose type and includes in addition to its belt pulley a rearwardly located power takeoff shaft 25. In accordance with my invention the forwardly extending end represented at 16a of the operating shaft 16 is driven directly from this power take off of the tractor and of course under control of the usual clutch mechanism incorporated on a tractor for controlling both the power takeoff and the belt pulley. This connection is made through a telescopically connected longitudinally extensible shaft 26 provided with the usual universal joints at its ends and covered for safety reasons by a guard 27 in the conventional fashion. In the particular type of corn sheller here shown, which is one well known on the market, the direction of rotation of the shaft 16 is opposite to that of the power takeoff shaft 25. It is necessary to use a reversing means in order to affect the necessary change of direction of rotation. For this purpose, I provide on the forward end of the sheller, and more specifically on the forward circular end disc 28 of the fan 20, a counter-shaft 29 which is journaled in a frame 30. This counter-shaft 29 is located in the lower and forward portion of the sheller housing and is more nearly in line with the power takeoff shaft 25 than would be the shaft extension 16a and is therefore more conveniently driven by the power takeoff. A large sprocket 31 is mounted on the counter-shaft 29 and trained thereover is a sprocket chain 32 running at one side over a drive sprocket 33 secured to the shaft end 16a and upwardly thereabove running over a reverse idler sprocket 34. The arrangement is thus obviously such that the direction of rotation of the counter-shaft 29 by the power takeoff is reversed as applied to the drive sprocket 33 and the shaft 16. The reverse idler pulley 34 is adjustable by means of the bolt 35 in order to keep the chain 32 taut. The sprockets 31 and 34 are arranged to run behind mounting plates 36 and 37 which are supported in operated relation to disc 28 by vertical angular bars or uprights 38 bolted at transversely spaced positions on the housing. The axle 39 of the idler sprocket 34 is carried by bearing plate 40 on the bolt 35 and adjustment of the bolt through its supporting bracket will of course tighten the chain 32.

It will be apparent from the foregoing that the corn sheller may now be operated without the necessity of disconnecting the tractor from its transport connection therewith and without the use of the troublesome belt mechanism. In this operation the tractor simply pulls the sheller to the desired location and then as the supporting member 11 is lowered, backs up the sheller slightly to move said member into supporting position. Thereafter the shelling operation may continue so long as required and the sheller may be drawn away simply by forward movement of the tractor. By such operation not only is a considerable saving of time effected but the tractor may serve as a firm anchor for the sheller while it is at work. The comparatively great weight of the tractor is of value here and in addition it will facilitate setting up and leveling the sheller, particularly when the ground is covered with snow as is usually the case at corn shelling time.

The cob stacker or elevator 23 in the usual sheller extends upwardly and forwardly from the frontal end of the sheller and therefore must be changed in its position to discharge the cobs out to one side. This I accomplish by the stacker driving and supporting means best shown in Figs. 3 and 4 and which now will be described in detail.

In the previous construction the lower, driven sprocket 59 of the cob stacker was driven by a transversely axised shaft 42 journaled at the forward and lower portion of the frame 6 and in turn driven by a sprocket chain 43 and sprockets 44 from a counter-shaft 45 forming a part of the operating mechanism of the sheller. In accordance with my invention a forwardly extending bracket arm 46 is mounted on the frame and the shaft 42 is journaled therein. Beveled gears 47 on the shaft 42 and on a short forwardly directed counter-shaft 48 then dispose the drive in a position at right angles to the former arrangement as clearly shown. The counter-shaft 48 is journaled by bearings 49 in longitudinally spaced plates 50 secured to bracket arm 46 and at its forward end the counter-shaft carries a rigidly mounted sprocket 51. Hanger brackets 52 are secured by their upper ends 53 to the bracket arm 46 and extend therefrom downwardly and outwardly in a direction away from the aforesaid drive mechanism. The lower ends 54 of these hanger arms 52 are vertically depended and receive thereon the rigidly mounted U-shaped yoke 55. The outwardly turned ends 56 of the yoke are notched as shown at 57. The notches 57 open outwardly to receive the bearings 58 carried on the shaft 60 of the cob stacker 23 and which shaft operates the drive sprocket 59 of the stacker. The bearings 58 are grooved as shown at 61 to enter the notches 57 and support the lower end of the stacker and the stacker is supported in the outwardly and upwardly inclined position shown by a brace rod 62 in a well known manner. The drag chain 63 is of course trained around the sprocket 59 and is operated by a sprocket 64 secured to a forward end of the shaft 60 and connected by chain 65 to the aforesaid sprocket 51. Angular braces 66 are secured to opposite sides of the hanger members 52 as shown and the forward brace is slotted as at 67 to receive the shaft 68 of a tightener sprocket 69. This sprocket 69 is thus adjustable to keep the chain 65 in a taut condition and urge the shaft 60 inwardly into the notches 57.

The hopper-like receiving end 70 of the cob stacker 23 in this laterally mounted position of the stacker is disposed beneath a forwardly and outwardly extension spout 71 leading from the discharge end 22 of the sheller housing. This spout 71 is thus adapted to lead the cobs outwardly and discharge them to the stacker 23 wherein they are elevated and discharged outwardly clear of both the sheller and the tractor.

The aforesaid mounting of the stacker in addition to supporting it in a laterally extended position also lowers its receiving end to the point where it will clear both the draft tongue 7 and the drive shaft 26 extending between the tractor and the sheller and it will be evident that the sheller is thus best adapted for use while in direct connection with the tractor. The spout 21 is of course adjustable in the usual manner in order to discharge the husks and other light material clear of the sheller. During transport of the sheller by the tractor this spout 21 is swung around to the rear and the feeder elevator 17 as well as the cob stacker 23 are detached and supported alongside the sheller in suitable brackets provided thereon.

The shellers of this type are sometimes mounted in a truck body and operated directly from the truck engine or by separate power unit. In either case the drive mechanism of my invention is of utility as well as the transverse mounting and arrangement of the cob stacker and such use of these mechanisms as well as such minor changes as may be required therein are considered to be within the scope of the present invention.

It is understood that suitable modifications may be made in the structure as disclosed, provided such modifications come within the spirit and scope of the appended claim. Having now therefore fully illustrated and described my invention, what I claim to be new and desire to protect by Letters Patent is:

A corn sheller including a housing having a cob discharge opening at the lower center portion of its forward end, a spout supported to receive cobs from said opening and discharge them in a lateral direction, an outwardly and downwardly inclined and disposed bracket device supported beneath the spout and having conveyor attachment means at its lower side, a cob conveyor supported in said attachment means in receiving position below the spout and extending in an upwardly and laterally inclined position from the sheller, and drive means for the conveyor supported on the said bracket device.

MARTIN RONNING.